United States Patent Office 2,998,459
Patented Aug. 29, 1961

2,998,459
PROCESS FOR CHLORINATING HYDROCARBONS
Samuel B. Baker and Jackson Eng, Sarnia, Ontario, Canada, assignors to Esso Research and Engineering Company, a corporation of Delaware
No Drawing. Filed Mar. 27, 1959, Ser. No. 802,316
13 Claims. (Cl. 260—650)

This invention relates to the halogenation of organic compounds. In particular, this invention relates to a novel process for the halogenation of hydrocarbons wherein control of the halogen-to-feed ratios are maintained by first adsorbing the hydrocarbon compound on certain crystalline zeolites. More particularly, this invention relates to the vapor phase halogenation of hydrocarbons in a fixed bed reactor wherein such hydrocarbons are first adsorbed on a crystalline alumino-silicate zeolite and contacted under halogenation reaction conditions with a halogen gas in a halogen-to-hydrocarbon ratio of about .1 to 5 to 1.

For purposes of simplicity this invention will be described in terms of chlorinating hydrocarbons it being understood that the technique herein described is applicable to other halogenation reactions, e.g. bromination and fluorination. Likewise this technique is not confined to the halogenation of compounds consisting only of carbon and hydrogen but may be applied to conventional halogenation reactions with organic compounds wherein the organic compound is directly contacted by an elemental halogen.

The reactions per se with which this invention is concerned are conventional halogenation reactions well known to the art and individually are to be conducted under the recognized conventional operating conditions of temperature, pressure, presence or absence of catalysts, diluents, etc. employed for such reactions. The inventive concept herein involved relates to the novel technique of carrying out and controlling such reactions with the aid of molecular sieves.

The chlorination of hydrocarbons and substituted hydrocarbons, e.g. oxygenated hydrocarbons such as alcohols and ethers, is of great industrial importance. The many chlorination products of such compounds have found a wide variety of uses among which are their use as solvents, chemical intermediates, pesticides, etc. The great number of by-products originate by the occurrence of:

(1) Polyhalogenations (substitution of more than one hydrogen).
(2) Dehydrohalogenations (loss of hydrogen halide) through high heat localizations.
(3) Additions of halogens to an olefinic or acetylenic bond.
(4) Halogenolysis (splitting of C—C bonds by means of halogens).

Thus, with the acyclic alkanes, single or multiple chlorine substitution may be effected to provide such compounds as mono-, di-, tri- or tetrachloromethane and the higher homologs thereof. The reactions of the cycyoalkanes depend to a large extent on the size of the ring with the lower-membered rings, e.g. cyclopropane and cyclobutane, often exhibiting reactions which result from the strained bond angles yielding acyclic chlorinated products. However, the larger cycloalkanes, e.g. cyclopentane and cyclohexane, and even the smaller rings under controlled conditions retain their ring structure in chlorine substitution reactions. Chlorine adds readily to the double bonds of both acyclic and alicyclic alkenes and alkadienes such as propylene, butadiene, cyclohexene, cyclohexadiene and the homologs thereof. At high temperatures, the addition of chlorine to olefinic hydrocarbons is accompanied by dehydrohalogenation to produce such compounds as vinyl chloride. The addition of chlorine to acetylene is accompanied by the formation of the explosive chloro-, and dichloro-acetylenes, Cl—C≡CH and Cl—C≡C—Cl. To avoid the formation of such compounds particularly, solvents such as SbCl$_5$ have been used to produce, in the chlorination of acetylene, such compounds as 1,1,2,2-tetrachloroethane.

In the chlorination of aromatic hydrocarbons the chlorination may occur as either nuclear or side chain chlorination depending on the hydrocarbon compound involved and the conditions of reaction. Thus, benzene is chlorinated to give chlorine substitution products up to and including hexachlorobenzene. The mono-chlorinated product is utilized, among other things, for the preparation of phenol and the aforesaid DDT while p-dichlorobenzene is sold as a moth repellent. The alkyl substituted benzenes such as the methyl and ethyl benzenes provide a vast array of known chlorination products. For example, in the methyl substituted benzene derivatives such as toluene, xylene, mesitylene, durene, etc., there may be mono-, di-, or tri-chlorinations of each methyl group such as are represented by the following:

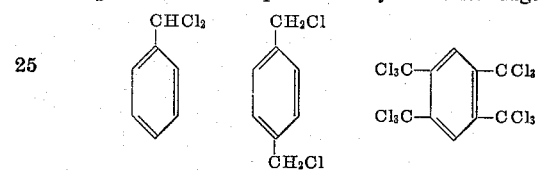

In addition, there may be both ring and side chain substitution as represented by the following formula:

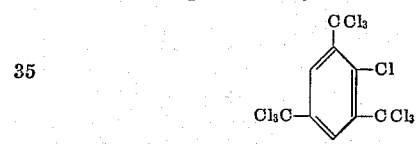

In general, nuclear chlorination is favored by low temperatures, the absence of light, the presence of chlorine carriers, iodine, iron or aluminum, etc. On the other hand, chlorination in the presence of sunlight or other chemically active radiation, as well as chlorination at the boiling point of the hydrocarbon, usually results mainly in substitution in the side chains.

Chlorination reactions also varying somewhat as hereinbefore set forth are highly exothermic reactions and hence are quite difficult to control. Thus, if the reacting molecules are allowed to accumulate, the start of the reaction may be followed by an explosion. This is particularly true when attempting to chlorinate hydrocarbons at high chlorine-to-feed ratios. Because of the highly exothermic nature of the reaction, it is difficult to disperse large quantities of chlorine efficiently and quickly into the hydrocarbon feed. A vigorous reaction often ensues, expelling quantities of reaction mixture from the reactor. The chlorination temperature increases rapidly and requires extreme precautions to prevent temperature runaway. The occurrence of small explosions with coking occurring is not uncommon. Hence, if a high chlorine-to-feed ratio is to be safely maintained the hydrocarbon feed must in some way be dispersed so as to bring such feed into contact with the chlorine at any given point in an amount sufficient to provide adequate rates of reaction but insufficient to establish explosive concentrations.

The prior art techniques for controlling the flow of chlorine to the reaction mixture are open to many objections. Even when the mechanical failures are not a problem the irregularity of chlorine acceptance by the chlorination feedstock tends to provide periods of both over- or under-chlorination.

By the process of this invention the problems of contact distribution aforementioned are overcome by a novel process utilizing molecular sieves.

It has been known for some time that certain zeolites, both naturally-occurring and synthetic, have an affinity for adsorbing aliphatic and aromatic hydrocarbons. The zeolites have crystal patterns such as to form structures containing a large number of small cavities interconnected by a number of still smaller holes or pores, the latter being of exceptional uniformity of size. Only molecules small enough to enter the pores can be adsorbed. The pores may vary in diameter from 3 to 6 Angstrom units to 12 to 15 or more, but it is a property of these zeolites or molecular sieves, that for a particular sieve the pores are of substantially uniform size. Thus, for the purposes of this invention a molecular sieve must be chosen having pore diameters of a size suitable for adsorption of the particular hydrocarbon or mixture of hydrocarbons which it is desired to chlorinate.

The general types of molecular sieves suitable for use with this invention, the preparation of which is hereinafter set forth in detail, are now well known to the art. The adsorbency of each type for various hydrocarbons of course varies as the pore size of the zeolite varies. In general, the lower pore size sieves selectively adsorb straight chain hydrocarbons and reject the branched chain isomers. Thus, it is known that the 4 Angstrom type sieves will quantitatively adsorb methane, ethane and propylene, and that the 5 Angstrom type sieves will quantitatively adsorb $C_1$ to $C_{14}$ n-paraffins, $C_2$ to $C_{14}$ n-olefins, $C_3$ to $C_6$ n-alkadienes and cyclopropane. Among the hydrocarbons, the 13X type sieves will adsorb, in addition to those compounds adsorbed by 4 Angstrom and 5 Angstrom sieves, are mono-nuclear aromatic hydrocarbons containing about 6 to about 14 carbon atoms, such as benzene, toluene, xylene ethylbenzene, diethyl benzene, etc. and cycloalkanes, alkenes and alkadienes containing up to about 6 carbon atoms in the ring and the methyl substituted derivatives of the same. Although not selectively adsorbed in the presence of straight chain compounds it is known that the 13X sieves will also adsorb branched chain acyclic alkanes and alkenes, e.g. 2,2-dimethyl butane and hence compounds of smaller minimum cross section. The adsorptive limits of the 13X type sieve may otherwise be defined as set forth in a British patent, specification No. 777,233, which describes the properties of the 13X type sieve. This patent recites that they will adsorb molecules whose minimum cross section is smaller than that of heptacosafluorotributylamine.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. 2,442,191. Zeolites vary somewhat in composition, but generally contain silicon, aluminum, oxygen and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e. the ability to selectively adsorb a straight chain hydrocarbon from a mixture containing the branched chain isomers, are described in an article, "Molecular Sieve Action of Solids," appearing in Quarterly Reviews, vol. III, pages 293–330 (1949), and published by the Chemical Society (London).

Molecular sieve adsorbents suitable for use in the process of the invention are available commercially and may be produced in a number of ways.

One suitable process for preparing such adsorbents involves the mixing of sodium silicate, preferably sodium metasilicate, with sodium aluminate under carefully controlled conditions. The sodium silicate employed should be one having a ratio of soda to silica between about 0.8 to 1 and about 2 to 1. Water glass and other sodium silicate solutions having lower soda-to-silica ratios do not produce the selective adsorbent crystals unless they are subjected to extended heat soaking or crystallization periods. Sodium aluminate solutions having a ratio of soda to alumina in the range of from about 1 to 1 to about 3 to 1 may be employed. High soda-to-alumina ratios are preferred and sodium aluminate solutions having soda-to-alumina ratios of about 1.5 to 1 have been found to be eminently satisfactory. The amounts of the sodium silicate and sodium aluminate solutions employed should be such that the ratio of silica to alumina in the final mixture ranges from about 0.8 to 1 to about 3 to 1, and preferably from about 1 to 1 to about 2 to 1.

These reactants are mixed in a manner to produce a precipitate having a uniform composition. A preferred method for combining them is to add the aluminate to the silicate at ambient temperatures using rapid and efficient agitation to produce a homogeneous mixture. The mixture is then heated to a temperature of from about 180° to about 215° F. and held at that temperature for a period of from about 0.5 to about 3 hours or longer. The crystals may be formed at lower temperatures but in that case longer reaction periods are required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The crystals prepared as described above have pore diameters of about 4 Angstrom units. To convert these to crystals having 5 Angstrom pores, it is necessary to employ a base exchange reaction for the replacement of some of the sodium by calcium, magnesium, cobalt, nickel, iron or a similar metal.

The base exchange reaction may be carried out by water washing the sodium alumino-silicate crystals and adding them to a solution containing the desired replacement ions. An aqueous solution of magnesium chloride of about 20% concentration, for example, may be used for preparation of the magnesium form of the 5 Angstrom sieve. After a contact time which may range from about 5 minutes to about an hour, the 5 Angstrom product is filtered from solution and washed free of the exchange liquid. About 50 to 75% of the sodium in the crystals is normally replaced during the base exchange reaction.

The molecular sieve known in the art as type 13X is a zeolite having somewhat larger pore openings, i.e. in the range of about 8 to 15 Angstrom units. These compositions have an empirical formula—

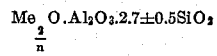

where Me is a metal and $n$ is its valence. These are prepared in a manner analogous to that of the small pore zeolites hereinbefore described save that the silica-to-alumina ratio is higher, i.e. a silica-to-alumina ratio in the range of about 2.7 to 3.8 to 1.

The crystals thus prepared are in a finely divided state and are usually pelleted with a suitable binder material before they are calcined in order to activate them. Any of a number of binder agents used in the manufacture of catalysts may be employed for this purpose. A binder consisting of bentonite, sodium silicate and water, for example, has been found satisfactory. In using this binder, the constituents should be mixed so that the product contains from about 5 to 10% bentonite, 5 to 15% sodium silicate and about 75 to 90% of the crystals on a dry basis and that the total mixture contains about 25 to 35% water. This mixture may then be extruded into pellets or otherwise shaped and subsequently dried and calcined. Calcination temperatures of from about 700° to about 900° F. or higher are satisfactory.

In one embodiment of the present invention the process of chlorination consists essentially of three steps:

(1) The hydrocarbon to be chlorinated is adsorbed on the molecular sieve until the adsorbent is saturated. The adsorption operation is carried out in a fixed bed reactor under conditions such that the adsorption is conducted preferably in the vapor phase. Liqiud phase adsorption may be employed but the adsorption rate is considerably slower.

(2) Chlorine diluted with nitrogen or other inert gas is then admitted into the reactor containing the hydrocarbon-saturated sieves. As the hydrocarbon is chlorinated, a hot zone is produced due to the highly exothermic nature of the reaction. The hot zone thermally desorbs in front of it a portion of the hydrocarbon which subsequently condenses just ahead of the hot zone. Consequently, a band of liquid hydrocarbon moves through the sieve bed as chlorination progresses. The chlorination operation may be discontinued when chlorine gas appears at outlet of reactor. The unreacted desorbed hydrocarbon is recycled back to the feed supply.

(3) The sieves are then heated and nitrogen-purged to recover the chlorinated hydrocarbon thus simultaneously reactivating the sieves. Instead of nitrogen-purging, vacuum stripping or solvent extraction may be employed.

By this novel process, the chlorination takes place in a narrow zone where a high chlorine-to-feed ratio is easily maintained. Thus, for example, in a test column used to chlorinate p-xylene in accordance with this invention wherein the column employed was 26 inches long and of 1½ inches in diameter, the chlorination zone was found to be only 1½ inches. Yet, the calculated chlorine-p-xylene mole ratio was as high as 5 to 1. As a comparison, literature data state that in a commercial process for chlorinating normal pentane the chlorine to normal pentane reacting mole ratio was maintained at 0.107. Thus, by adsorbing the feed, on the aforedescribed molecular sieves the feed is dispersed over a large surface area and when chlorination occurs, the reaction is uniform. The sieves themselves serve as "heat sinks," an appreciable portion of the heat given off in a reaction being dissipated in heating the sieves. This control feature and the heat absorption both held to level out the chlorination temperature and hence with this method of chlorination the chlorination temperatures are therefore much easier to control.

The process of this invention can easily be modified by those skilled in the halogenation art to conform with the feedstock to be halogenated and the degree and type of halogenation desired. The only limitations for the process of this invention are those imposed by the known reaction conditions of the various conventional halogenation reactions and the physical endurance of the zeolites. Hence the invention may be practiced, as far as pressure is concerned, between about 20 mm. Hg and 200 atmospheres and between temperatures of about −30° F. and 800° F.

A diluent may be used with this invention as in the conventional processes. If such diluent is used it should be either inert to the halogen or form stable compounds with the halogen that will not react with the halogenated products of the desired reaction. The halogenated hydrocarbons having a boiling point that will permit them to vaporize readily at the temperature of reaction are particularly good for this purpose. Of these carbon tetrachloride is preferred in the chlorination reactions. When a diluent is employed the diluent to organic reactant mole ratio should be in the range of about .5 to 10 to 1.

The time for carrying out these reactions by the process of this invention can vary widely depending on the organic reactant, the temperature and pressure of reaction, the presence or absence of a catalyst, and the end product desired. In general, the reactions may be conducted in a time in the range of 0.1 to 15, preferably 0.1 to 2 hours.

The invention may be more easily understood by resort to the following examples which are to be construed as illustrative only and the wide application of the invention should not be considered to be limited by the specific details disclosed therein.

Example I

A 13X type crystalline sodium alumino-silicate molecular sieve was prepared as follows:

350 grams of sodium metasilicate ($NaA_2O.SiO_2.5H_2O$) were dissolved in 13 liters of $H_2O$ at room temperature. Using rapid stirring, 2650 grams of a sodium aluminate solution (20% $Al_2O_3$ and 1.5 $Na_2O.Al_2O_3$ molar composition) were added to the silicate solution. An additional 10 liters $H_2O$ were added to facilitate stirring. The composite slurry was heated to 180° to 210° F. and maintained at these temperatures for 240 hours. The slurry was cooled, filtered, and washed well with water. After oven drying at 250° F. and calcining for 4 hours at 850° F., the material was analyzed and showed a relative stoichiometric composition of $Na_2O.Al_2O_3.2.7SiO_2$. The product had an adsorptive capacity for n-heptane, toluene and p-xylene of about 0.20 cc. per gram.

Example II 300 grams of type 13X sieves, packed in a 1½ inch diameter column were saturated with 48 grams of p-xylene at 400° F. The saturated sieves were cooled to 80° F. and a mixture of 25% chlorine in a nitrogen diluent was passed through the sieve bed to chlorinate the sorbed p-xylene. As the chlorination progressed, the highly exothermic nature of the reaction created a narrow hot zone which gradually moved through the sieve bed. With a chlorine space velocity of 15 v./v./hr., the temperature of the hot zone reached about 400° F. The observed hot zone was only about 1½ inches in width and the calculated chlorine to p-xylene mole ratio in the zone was 3.0. This moving hot zone desorbed in front of it about 30 grams of the initially sorbed p-xylene, which could be recycled back to the feed supply. When chlorine gas appeared at the outlet of the reactor, the chlorination operation was discontinued. Total chlorinating time was about 5 hours.

The sieve bed was gradually heated to 800° F. and simultaneously purged with a small nitrogen stream (approximately 50 to 100 cc./minute) to recover the chlorinated product and to reactivate the sieves. About 25 grams of a white needle-like crystalline product was recovered. Analyses revealed it to be essentially 2,3,5,6-tetrachloro p-xylene along with about 1.5 to 2% unreacted p-xylene.

The recrystallized product from glacial acetic acid had a melting point of 221 to 223° C. Literature reported a melting point for 2,3,5,6-tetrachloro p-xylene 222 to 223° C.

Example III

The same procedure as described in Example II was employed but the chlorinating gas consisted of 5% chlorine with nitrogen diluent. In this case, with a chlorine space velocity of 20 v./v./hr., the temperature of the hot zone was only 270° F. The hot zone was approximately 2 inches in width and the calculated chlorine to p-xylene mole ratio in the zone was 4.9. Total chlorination time was 7 hours. Of the 45 grams of p-xylene that were sorbed on 300 grams of 13X sieves, 20 grams were desorbed by the hot zone. About 31 grams of chlorinated xylene were recovered by thermally desorbing at 700° F. An additional 13 grams were recovered by extraction with ethyl alcohol at 125° F. The product was the same as in Example II.

Example IV

A chlorination reaction is conducted by contacting a 5 Angstrom type molecular sieve saturated with ethylene with chlorine gas in a reaction vessel maintained at atmospheric pressure. The reaction occurs spontaneously and upon completion an addition product of chlorine and ethylene is obtained. Carbon tetrachloride is employed as a diluent in a diluent-to-olefin ratio of 1 to 1.

Example V

A chlorination reaction is conducted in accordance with Example IV except that a glass reaction vessel is used, the hydrocarbon feed is n-butane and a source of ultra violet light is used as a catalyst. A chlorine substituted hydrocarbon product is recovered.

All percentages herein set forth and not otherwise designated or defined shall be construed as percentage by weight.

The terms "sorb," "sorbed" and "sorption" are used herein to include adsorption and/or absorption.

What is claimed is:

1. An improved process for chlorinating hydrocarbon compounds which comprises sorbing a hydrocarbon compound on a crystalline metallic alumino-silicate zeolite having uniform pore openings in the range of about 4 to about 15 Angstrom units and contacting said zeolite with chlorine under chlorination reaction conditions.

2. A process in accordance with claim 1 wherein said hydrocarbon is a saturated aliphatic hydrocarbon.

3. A process in accordance with claim 1 wherein said hydrocarbon is an unsaturated aliphatic hydrocarbon.

4. A process in accordance with claim 1 wherein said hydrocarbon is an aromatic hydrocarbon.

5. An improved process for chlorinating hydrocarbon compounds which comprises sorbing a hydrocarbon compound on a crystalline metallic alumino-silicate zeolite having uniform pore openings from about 4 to 15 Angstrom units in diameter, contacting said zeolite in a reaction zone with a chlorine gas at a temperature in the range of $-30°$ F. to $800°$ F. and a pressure in the range of 20 mm. Hg. to 200 atmospheres.

6. A process in accordance with claim 5 wherein said pressure is about 1 atmosphere.

7. A process in accordance with claim 5 wherein said temperature is in the range of $-30°$ F. to $275°$ F.

8. A process in accordance with claim 5 wherein said hydrocarbon is p-xylene.

9. A process in accordance with claim 5 wherein said hydrocarbon is ethylene.

10. A process in accordance with claim 5 wherein said hydrocarbon is n-butane.

11. An improved process for producing chlorinated hydrocarbons which comprises saturating a crystalline metallic alumino-silicate zeolite having uniform pore openings in the range of 4 to 15 Angstrom units in diameter with a hydrocarbon having a molecular minimum cross section smaller than the largest of said pore openings, contacting said zeolite in an enclosed reaction vessel with a chlorine containing gas at a temperature in the range of $-30°$ F. to $800°$ F. and a pressure in the range of 20 mm. Hg and 200 atmospheres in the presence of actinic light.

12. A process in accordance with claim 11 wherein said chlorine containing gas is diluted with nitrogen.

13. An improved process for producing chlorinated hydrocarbons which comprises saturating a crystalline metallic alumino-silicate zeolite having uniform pore openings in the range of 4 to 15 Angstrom units in diameter with hydrocarbon molecules whose minimum cross section is smaller than that of heptacosafluorotributyl amine, contacting said zeolite in a fixed bed reactor with chlorine at a temperature in the range of $-30°$ F. to $800°$ F. and a pressure in the range of 20 mm. Hg and 200 atmospheres and a chlorine-to-hydrocarbon mole ratio in the range of 0.1 to 5 to 1.

References Cited in the file of this patent

UNITED STATES PATENTS

| | | |
|---|---|---|
| 2,756,127 | James et al. | July 24, 1956 |
| 2,756,247 | James et al. | July 24, 1956 |

FOREIGN PATENTS

| | | |
|---|---|---|
| 777,233 | Great Britain | June 19, 1957 |